Nov. 12, 1957

V. DURBIN 2,813,164

HEAVY DUTY TREADLE

Filed April 4, 1956

INVENTOR.
VERNON DURBIN

BY James and Franklin

ATTORNEY

Nov. 12, 1957 V. DURBIN 2,813,164
HEAVY DUTY TREADLE
Filed April 4, 1956 3 Sheets-Sheet 2
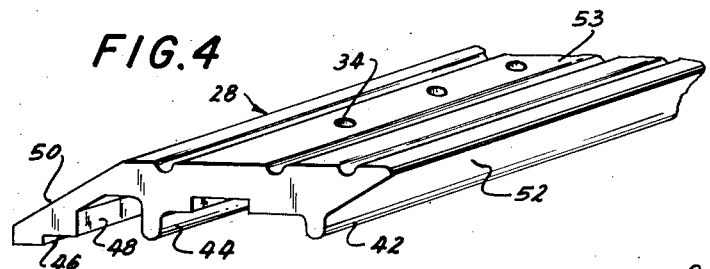
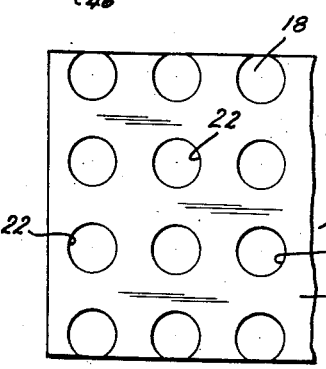
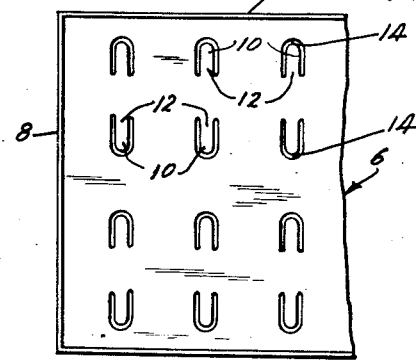
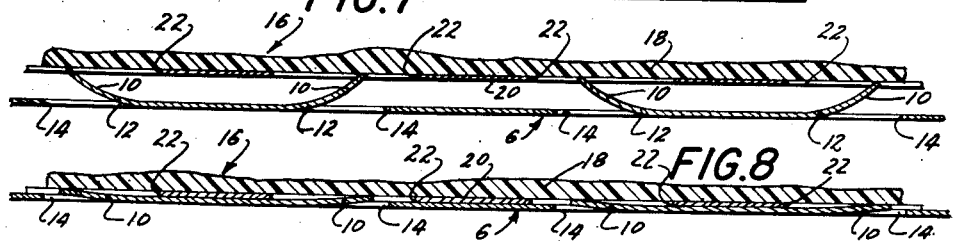
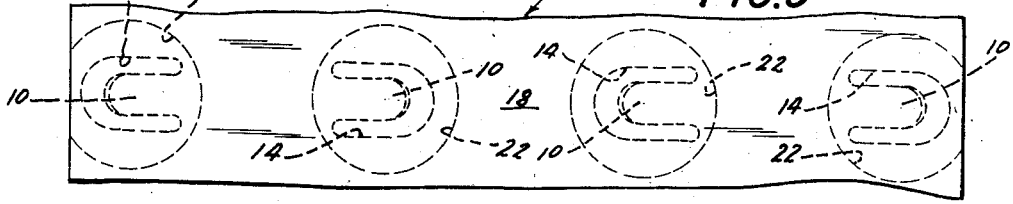
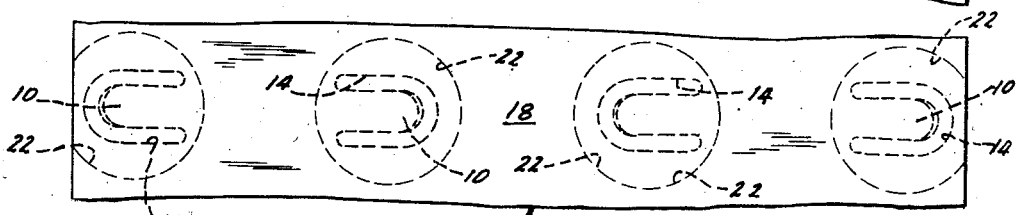
INVENTOR.
VERNON DURBIN
BY
*James and Franklin*
ATTORNEY

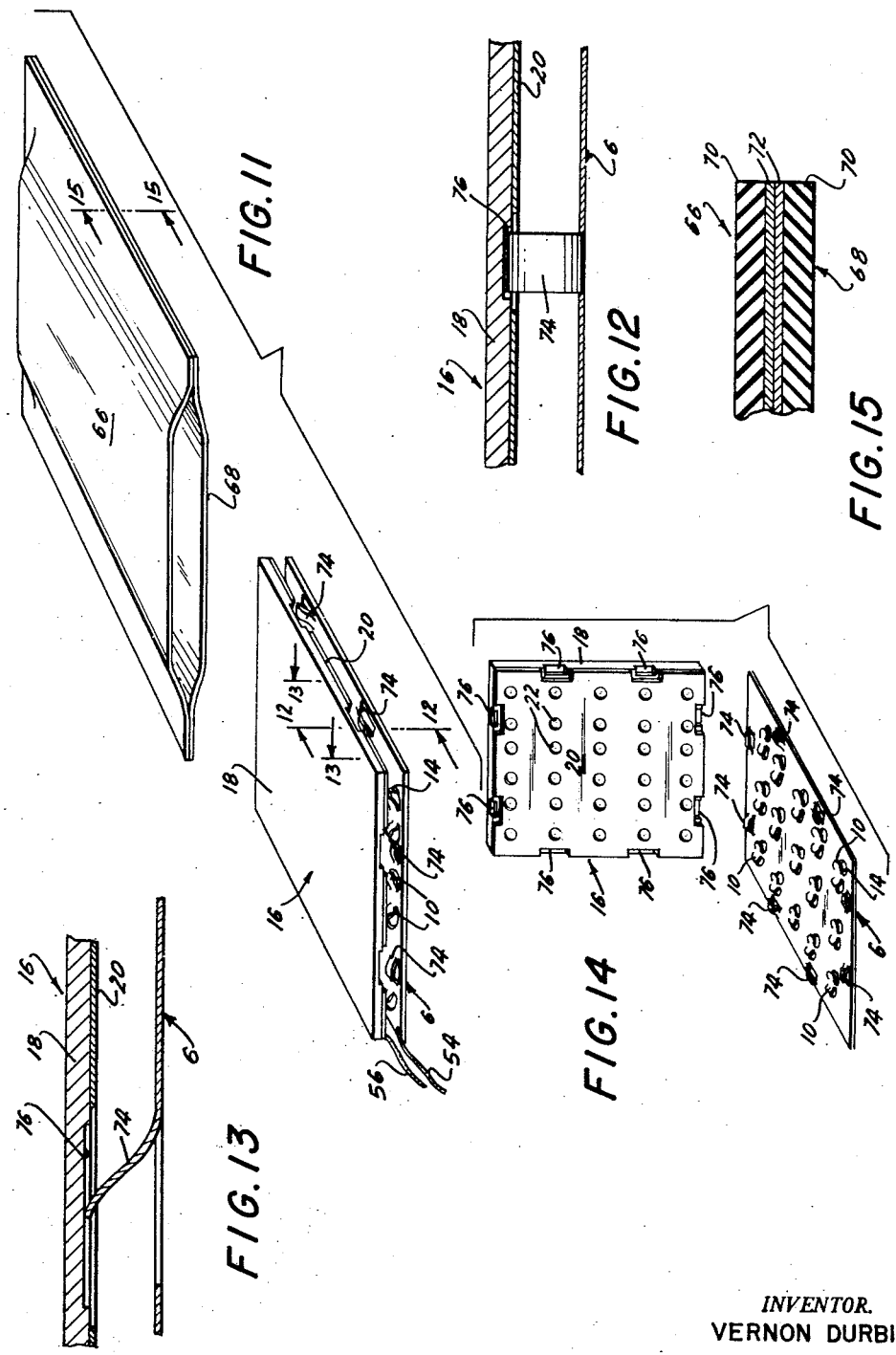

United States Patent Office 2,813,164
Patented Nov. 12, 1957

2,813,164

HEAVY DUTY TREADLE

Vernon Durbin, Waban, Mass., assignor to National Pneumatic Co., Inc., Boston, Mass., a corporation of Delaware Application April 4, 1956, Serial No. 576,064

11 Claims. (Cl. 200—86)

The present invention relates to a threadle of the type used, for example, to open and close a control circuit and thus initiate the opening and closing of doors or the like in response to the sensing by the threadle of a weight thereon, and in particular to such a threadle adapted to reliably support very intense concentration of weight at localized areas of its surface.

The use of floor-mounted treadles to control the opening and closing of doors and the like is an extremely old expedient. Conventionally they comprise a pair of conductive elements electrically connected to opposite sides of a control circuit and normally spring urged apart. Whenever a weight is placed on the treadle which is sufficient to compress the springs, the conductive elements are moved into engagement, the control circuit is closed, and the appropriate external operation, such as the opening of the door, is initiated.

Obviously such treadles are effective only if the conductive elements are separated when the required weight is not present on the treadle. While this would appear to be a fairly simple matter, in practice it has not proved to be so, largely because of the great forces to which the treadles are often subjected, which forces tend toward distortion of the treadle elements. In industrial installations, where heavy duty treadles are required as a matter of course, a truck rolling on small diameter casters and heavy loaded quite often exerts a pressure of two tons or more per square inch on that restricted area of the treadle which it engages, and such pressure if applied at certain points will be sure to cause damage eventually. Even on treadles not likely to be subjected to such great pressures, the problem still exists. The high pressure concentration which results from the engagement of that treadle with the tip of a crutch supporting a crippled man greatly exceeds the pressure which would result if his weight were distributed normally by his feet. Ladies' high heels present a similar problem.

The situation is complicated by the requirement that the treadles in general must be actuatable by light weights as well as by exceedingly heavy weights. The weight of an empty hand truck or even of an individual should be sufficent to actuate the treadle even though that treadle must be capable also of being actuated without damage by weights of many tons. It is very difficult to design a treadle which will reliably resist distortion when subjected to heavy weights and high pressure concentrations, and which is sensitive enough to detect light weights.

Another complicating factor is the requirement that while the treadle must have an appreciable surface area it must be capable of actuating the control circuit no matter where on that area pressure may be applied.

The structures of the prior art have attempted to satisfy these various requirements essentially by a process of compromise and by a comparative complexity of structure which adds greatly to the expense of the product. In order to provide for sensitivity of the treadle over its entire surface, a large number of indivdual electrically contacting areas are provided, but there are still areas where, if pressure is applied, electrical connection is by no means certain. In order to make the treadle sensitive to light weights, comparatively weak springs are employed to separate the elements adapted to electrically engage one another, and in order to permit the treadle to withstand high pressures, more stiffly resilient reinforcing elements are provided between or adjacent such elements. As a result the sensitivity of the treadle varies from point to point over its surface, and, moreover, the application of a very high concentration of pressure will, if exerted just next to or partially over and partially to one side of the reinforcing elements, tend to distort the structural elements of the treadle, thus eventually leading to a situation in which electrical connection is made through the treadle even when no weight at all is applied thereto. Obviously this destroys the treadle's usefulness, and it must either be repaired or replaced.

According to the present invention treadle sensitivity is achieved without any sacrifice in uniformity of sensitivity over the entire area of the treadle, and the construction is such as to make it almost impossible to distort the treadle elements, hence making the life of the treadle substantialiy independent of length or manner of use.

To accomplish these objectives the elements adapted to make electrical connection through the treadle are defined by plates having opposing faces. These plates are normally urged apart by means of springs, but when pressure is applied to the treadle the plates are moved into engagement. Specifically, they are moved into face to face engagement over all or a substantial proportion of their entire opposing faces. The springs which normally urge the plates apart are so constructed and mounted as not to interfere with the face to face engagement of the treadle plates. When the treadle is depressed, therefore, the weight of the object depressing it is transmitted to the floor through a solid thickness of material. Hence only a force capable of actually indenting a solid metal sheet can in any way modify the operative structural elements, and even then such modification or distortion would probably not affect the functioning of the device. In addition, because of the face to face contact of the plates, a contact area of appreciable magnitude results, thus ensuring that the control circuit will be closed even though certain portions of the facing surfaces of the treadle plates may be dirty or corroded.

The springs which maintain the plates normally spaced from one another are distributed over the area of the plates. In order that they should not interfere with face to face contact between the plates, they are housed within recesses in the plates, the recesses being sufficiently deep so that when the plates are in face to face contact the depth of the recesses will be no less than the solid height of the compressed spring. Furthermore, in order to ensure that the treadle will be able reliably to support weight with localized very high pressure concentrations over its entire operative surface not excluding the areas where the springs are provided, the recesses within which the springs are received are adapted to have substantially the same depth as the solid height of the springs when compressed, and the springs are adapted to substantially fill those recesses. Hence there is no appreciable discontinuity in the solidity of the depressed treadle. As a consequence, no matter where the localized high concentration of weight may be applied over the upper surface of the treadle, that weight will be resisted by a solid, rigid, and unyieldable structure, thus effectively ensuring against distortion.

In my application Ser. No. 459,414, filed September 30, 1954, and entitlde "Heavy Duty Treadle," which application is assigned to the assignee of the instant application, a construction is disclosed which operates on the above principle. There the springs are formed at least in part of insulating material and are separate from the plates, the spring being inserted into recesses formed in the plates during assembly of the treadle. Hence assembly is a fairly time consuming, and consequently expensive, matter. Moreover, the separate formation of individual springs of material different from any other part of the treadle represents a significant factor of cost.

The structure of the present invention overcomes these difficulties by providing for the formation of the springs which separate the plates integrally with one of the plates, those springs being displaced from the body of the plate, thus leaving recesses within the plate of the proper size and thickness within which the springs may be housed when the plates are moved together in face to face contact. Since the plate from which the spring is formed is usually conductive, and since the other plate generally also has a facing conductive surface, some means must be provided for electrically separating the springs from the conductive surface of the plate engaged by the springs. This can very readily be done by utilizing, for that second plate, a backing sheet of insulating material with a layer of conductive material on the surface thereof opposing the plate which carries the springs. That conductive layer is interrupted by non-conductive areas in registration with the springs, with which the springs make contact and over which the springs slide as the plates move toward and away from one another. These non-conductive areas can be produced by covering a portion of the conductive surface with appropriate insulating material, but it is found to be more convenient to provide recesses in the conductive surface through which the insulating backing sheet is exposed. The conductive layer may be very thin, and may even be produced by conventional printed circuit techniques, so that the depth of these recesses is insignificant. Hence, when the plates are moved together, they still present substantially a solid thickness, so that distortion of the plates upon the application of high pressure concentrations on limited areas thereof will not give rise to damage or distortion.

One very practical problem which arises in the use of treadles of the type here under discussion, particularly when those treadles are located out of doors, is the protection of the interior of the treadle from water or moisture. This problem is accentuated by the necessity for bringing leads out through the treadle. In accordance with the present invention this difficulty is overcome by specific design of the parts of the frame in which the plates are mounted. The bottom plate is mounted on a base plate which extends out therebeyond. A cover member, usually in the form of a rubber sheet, is positioned over the top plate and extends out therebeyond and beyond the bottom plate so as to extend over the outer portions of the base plate. A plurality of closure members are secured to the outer portions of the base plate and compress the outwardly extending portions of the cover member between themselves and the base plate, thus providing an effective seal around the plates. The closure members are also provided with channels extending longitudinally thereof outside the area where the cover member is compressed. The channels in each of the closure members communicate with one another. The treadle is provided with an opening communicating with one of the channels. The leads are adapted to be connected to the upper and lower plates respectively at points remote from the opening in the treadle, and a slot is provided in the appropriate closure member opposite the point where the leads are connected to the plates, the leads extending through that slot from the plates to the channel in that closure member. The leads extend under the cover member, so that an effective seal can be provided at that point despite the fact that the closure member is there slotted. The leads then extend freely through the channels to the opening in the treadle, through which opening they escape from the treadle. Since that opening is remotely positioned relative to the slot through which the leads pass, it is difficult for moisture, water or other deleterious substances to pass from the opening to the slot, and such substances as reach the slot will still be prevented from entering the interior of the treadle because of the seal produced at the slotted area.

The plate and spring combination of the present invention is also very well adapted for use in other types of frameworks than that just described. For example, that combination may be inserted as a unit into an envelope defined by a pair of sheets of reinforced rubber or rubber-like material, the edges of those sheets projecting beyond the plate unit being sealed to protect the interior thereof.

To the accomplishment of the above, and to such other objects as may hereinafter appear, the present invention relates to the structure of a heavy duty treadle as defined in the appended claims and as described in this specification taken together with the accompanying drawings in which:

Fig. 4 is a fragmentary perspective view of one of the side closure members;

Fig. 5 is a fragmentary bottom plan view of the upper treadle plate;

Fig. 6 is a fragmentary top plan view of the lower treadle plate;

Fig. 7 is a fragmentary cross sectional view of the treadle with the upper and lower plates urged apart, that corresponding to the open circuit condition;

Fig. 8 is a cross sectional view similar to Fig. 7 but showing the upper and lower plates moved together into engagement, that corresponding to the closed circuit condition;

Fig. 9 is a fragmentary top plan view of the treadle in the position shown in Fig. 7;

Fig. 10 is a top plan view of the treadle shown in the position of Fig. 8;

Fig. 11 is a three-quarter perspective exploded view of a second embodiment of the present invention;

Fig. 12 is a cross sectional view taken along the line 12—12 of Fig. 11;

Fig. 13 is a cross sectional view taken along the line 13—13 of Fig. 11;

Fig. 14 is a three-quarter perspective view of the upper and lower treadle plates of the embodiment of Fig. 11, the upper plate being rotated ninety degrees to show its lower face; and Fig. 15 is a cross sectional view taken along the line 15—15 of Fig. 11.

Figure 1:
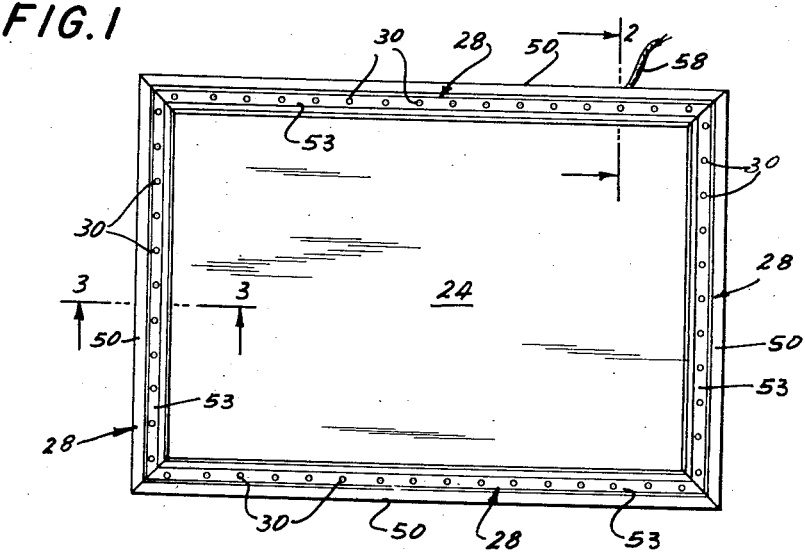
Fig. 1 is a top plan view of one embodiment of the present invention.

The first embodiment of the present invention, illustrated in Figs. 1–10, is of a type particularly suitable for use on floors or on the ground, where heavy objects such as carts or the like are adapted to be rolled thereover. It comprises a base plate 2 of appropriate size, which may be formed of aluminum or other comparable structural material which is preferably essentially non-conductive in nature. The base plate 2 is essentially flat, so as to rest upon a suitable supporting surface such as a floor or the ground, but may be provided with recessed portions 4 on its underside near the periphery thereof, which recessed portions, in the form here specifically disclosed, may be formed by raising portions 2a of the base plate 2 above the general level thereof.

The lower plate of the treadle, generally designated 6, may be formed of a sheet of resilient conductive metal such as Phosphor bronze. The size of the bottom treadle plate 6 is smaller than the base plate 2 so that the bottom plate 6 lies well inside the recessed portions 4. The edges of the bottom plate 6 may be turned up, at 8, in order to assist in locating plate 6 relative to the base plate 2, as will become apparent hereinafter. If the size of the treadle so warrants, a plurality of individual bottom plates 6 may be positioned side by side on the base plate 2, in which event the bent-up portions 8 would be provided only on the periphery of the composite lower treadle plate as defined by the plurality of individual plates 6.

Portions of the plate 6 are bent up therefrom to define tongues 10 connected to the plate 6 only at their bases 12, thus leaving recesses 14 in the plates 6. These recesses 14, as here shown, may be slightly larger than the tongues 10 so that even when the tongues 10 are flattened, thus being received within the recesses 14, the tongues 10 are still spaced from the plate 6 except at their bases 12. Since the material of which the plate 6 is formed is resilient, the tongues 10 will tend to remain in their raised position but may be resiliently forced down into the recesses 14.

The upper treadle plate, generally designated 16, here comprises a non-conductive base 18 formed, for example, of phenolic resin, on the undersurface of which is a conductive layer 20 which may be in the form of a sheet of conductive material adhesively secured to the lower surface of the base 18 or which may comprise a very thin conductive layer deposited on that undersurface by any of the conventional printed circuit techniques. In the drawings the layer 20 is shown as having an appreciable thickness, but this is solely for purposes of clarity of illustration, and it will be appreciated that the actual thicknesses, particularly when printed circuit techniques are employed, may be on the order of but a few thousandths of an inch. The conductive layer 20 is provided with a plurality of non-conductive areas 22, one for each of the tongues 10 on the bottom plate 6 and registering with those tongues 10. In the form here specifically disclosed the non-conductive areas 22 are defined by openings extending completely through the layer 20, thus exposing the lower surface of the non-conductive base 18. However, an equivalent construction could be produced by utilizing a continuous layer 20 and covering selected areas 22 thereof with appropriate insulating material. Another equivalent arrangement, as will be seen, can be provided by coating the tongues 10 extending up from the plate 6 with insulating material on those surfaces thereof which engage the upper treadle plate 16. The size of the upper treadle plate 16 is here shown as somewhat smaller than the size of the lower plate 6. As was the case with the lower plate 6, the upper plate 16 may be formed in one piece or from a plurality of sections as may appear convenient or appropriate.

The upper treadle plate 16 is secured by adhesive or in any other appropriate manner to a cover member 24 in the form of a flexible sheet of rubber or the like, the size of the sheet 24 being greater than that of either the lower plate 6 or upper plate 16, the sheet 24 therefore having peripheral portions 26 which extend out beyond the periphery of the lower and upper plates 6 and 16 respectively.

Side closure members generally designated 28 are secured to the laterally projecting portions of the base plate 2, engage the peripheral portions 26 of the cover member 24, and press those peripheral portions 26 against the base plate 2 so as to define a seal around the lower and upper treadle plates 6 and 16. As here specifically disclosed the closure members 28 comprise strips of appropriate structural material such as aluminum held in place by means of screws 30 which pass through apertures 32 in the members 28 and the heads of which are received within countersunk portions 34, those screws 30 threadedly engaging nuts 36 which pass through apertures 38 in the raised portions 2a of the base plate 2, the heads 40 of the nuts 36 being received within the recesses 4 provided in the lower surface of the base plate 2. The closure members 28 are provided on their lower surfaces with an inner rib 42 which directly engages the peripheral portion 26 of the cover sheet 24. Outwardly thereof the closure member 28 is provided with a rib 44 which rests on the upper surface of the base plate 2 and with another portion 46 outwardly spaced from the rib 44 and also engaging the upper surface of the base plate 2, a longitudinally extending channel 48 being defined between the rib 44 and the portion 46. The outer upper surface of the member 28 may be inclined, at 50, so as to facilitate the rolling of trucks or the like onto the treadle, and the lower inner surface 52 of the member 28 may also be inclined in order to provide a guide for the cover sheet 24.

Figure 2:
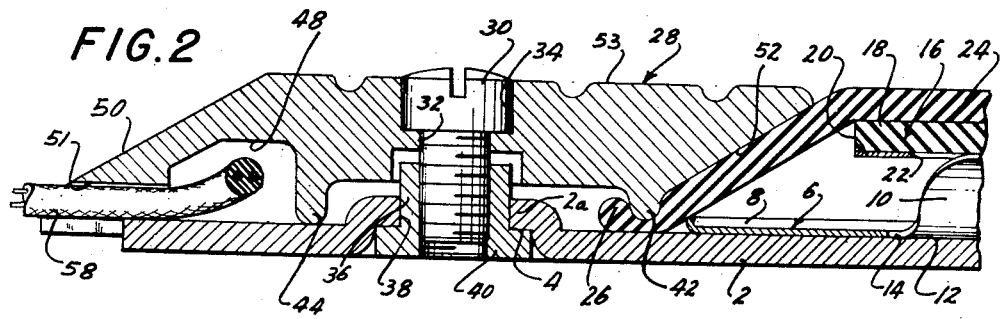
Fig. 2 is a partial cross sectional view taken along the line 2—2 of Fig. 1.
Figure 3:
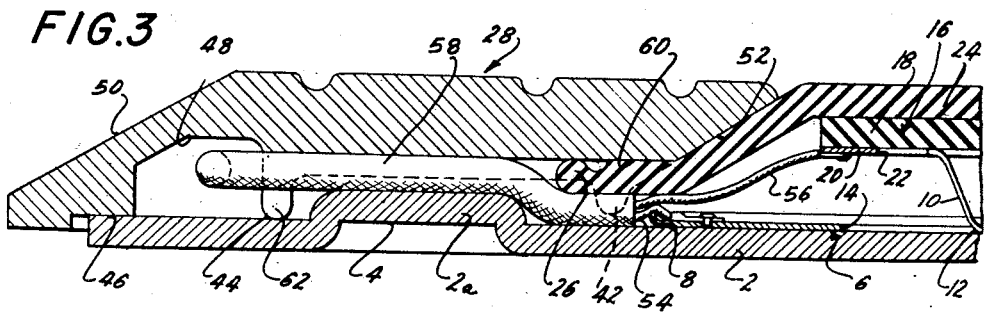
Fig. 3 is a partial cross sectional view taken along the line 3—3 of Fig. 1.

The treadle is assembled with the parts in the relative positions shown in Figs. 2 and 3. The lower treadle plate 6 is so sized that the turned-up portions 8 at its periphery engage the inner surfaces of the peripheral portion 26 of the cover sheet 24 so as to be positioned thereby. If desired, of course, any other suitable means, such as spot welding, might be employed to fix the position in the lower plate 6 relative to the base plate 2. The non-conductive areas 22 in the upper treadle plate 16 are in registration with the tongues 10 extending up from the lower treadle plate 6, and the size of the areas 22 is such that the tongues 10, throughout their range of movement, will never engage with the conductive layer 20. The tongues 10 tend to separate the plates 6 and 16, lifting the latter substantially to the position shown in Figs. 2, 3, 7 and 9, in which the upper surface of the cover sheet 24 is substantially on the same level as the exposed and flat upper surface 53 of the side closure members 28. Since, in the form here specifically disclosed, the fingers 10 engage the exposed surface of the non-conductive base 18 of the upper treadle plate 16, the plates 6 and 16 are maintained electrically separated. Since the fingers 10 and the corresponding non-conductive areas 22 are distributed over the entire area of the treadle, the plates 6 and 16 will be retained in electrically separated position.

Leads 54 and 56 are connected respectively to the conductive plate 6 and the conductive layer 20 of the lower and upper treadle plates 6 and 16 respectively. These leads 54 and 56 may be part of a cable 58. The cable 58 extends out to the channel 48 in the closure members 28 via slots 60 and 62 cut or otherwise formed in the ribs 42 and 44 respectively (see Fig. 3). The cable 58 then extends along the channel 48 in one or more of the closure members 28, the channels 48 in the individual closure members 28 communicating with one another, until it reaches an opening 51 formed in the base plate 2 beneath the channel 48 (see Fig. 2), through which opening the cable 58 escapes from the treadle so that it can be connected to any appropriate control mechanism. The slot 60 in the rib 42 is only slightly wider than the cable 58 and is appreciably filled by the cable 58 and by the compressible peripheral portions 26 of the cover sheet 24, and all gaps are closed by a rubber cement of considerable body, thus maintaining an effective seal completely around the treadle plates. The opening 51 in the base plate 2 is preferably positioned quite remote from the slots 60 and 62 in the ribs 42 and 44 respectively so that the entry of foreign matter such as water, moisture or dust into the interior of the treadle is substantially prevented. The point where the cable 58 extends out from the interior of the treadle through the slot 60 represents the weakest point of the seal defined by the compressed peripheral cover sheet portions 26, and the length and tortuousness of the path from the base plate opening 51 to that point assists in maintaining the security of the interior of the treadle.

When downward pressure is applied to any point on the upper surface of the cover sheet 24 the upper treadle plate 16 will be forced downwardly. Because of the essential rigidity of the upper cover plate 16 it will move downwardly not only at the precise area where pressure is applied thereto but also over an appreciable area therearound. The resilient fingers 10 will yield against this pressure, the downward movement of the upper treadle plate 16 serving to flatten the fingers 10, the fingers 10 thus sliding over the non-conductive areas 22 and being received within the recesses 14 formed in the lower treadle plate 6. The downward movement of the upper treadle plate 16 will continue until the conductive layer 20 on the lower surface thereof engages the upper surface of the lower conductive plate 6. When this occurs a circuit will be completed between the leads 54 and 56, thus actuating the control mechanism to which those leads are connected and hence, for example, initiating a door opening and closing cycle.

When pressure is released from the cover sheet 24 the fingers 10 will resume their raised positions, the upper treadle plate 16 will be raised to resume its position shown in Figs. 2 and 3, the conductive layer 20 will separate from the lower conductive plate 6, and the circuit between the leads 54 and 56 will be open.

The strength of the fingers 10 is such that they will yield and permit the upper treadle plate 16 to move the circuit closing position upon the application of but moderate pressures, such as might be caused by the weight of an individual. However, when the treadle plates are in circuit-closing position, as may best be seen from Fig. 8, they will collectively, together with the base plate 2 and the cover sheet 24, constitute an essentially solid unit, which will therefore be capable of withstanding very great weights and exceedingly high pressure concentrations without deformation or damage. The only departure from absolute solidity will be at the non-conductive areas 22 when those are defined by recesses in the layer 20. These departures from absolute solidity will be minimal and unimportant, and will be completely negligible when, as is preferred, the conductive layer 20 is formed by printed circuit thicknesses and hence is but a few thousandths of an inch thick. Since the thickness of the conductive layer 20 is exaggerated in Fig. 8, the fingers 10 appear not to be fully received within the recesses 14 in the lower plate 6, but when the thickness of that layer 20 is of "printed circuit" magnitude, the departure from absolute solidity will be much less than that appearing in Fig. 8.

Thus the treadle construction of the present invention, while capable of being actuated by light weights and hence being useable in applications where the weight of a single individual is to be controlling, is nevertheless also capable of use in industrial installations where exceedingly heavy weights and exceedingly high pressure concentrations may be expected.

The lower and upper treadle plates 6 and 16 constitute a treadle sub-assembly which can readily be used in treadles of a type other than that specifically disclosed in Figs. 1–10. Figs. 11–15 disclose such a unit utilized in a flexible or semi-flexible envelope of the type customarily employed in connection with the operation of the rear doors of public conveyance vehicles. The envelope in which the unit is received comprises upper and lower sheets 66 and 68 conventionally defined by layers of rubber 70 reinforced by sheets 72 of canvas imbedded therein. The layers 66 and 68 are sealed together along three of their edges in any appropriate manner, their fourth edges initially being unsecured as shown in Fig. 11. The treadle unit comprising the lower and upper treadle plates 6 and 16, from which leads 54 and 56 extend, is slid into the envelope defined by the sheets 66 and 68, after which the unsecured edges of those sheets are secured together in any appropriate manner, as by the use of stitching and/or adhesive, the leads 54 and 56 extending out therefrom. In the form specifically disclosed in Figs. 11–15 the relative positions of the lower and upper plates 6 and 16 may be fixed, so as to ensure that the fingers 10 are always received within the non-conductive areas 22 without engaging the conductive layer 20, by striking up additional fingers 74 from the lower plate 6 adjacent the periphery thereof, those fingers 74 being received within recesses 76 extending into the body of the base 18 of the upper plate 16, the conductive layer 20 preferably extending to points short of the edges of the recesses 76. Engagement of the fingers 74 with the side edges of the recesses 76 without engaging the conductive layer 20 will serve to relatively locate the plates 6 and 16, preventing one from sliding laterally or longitudinally relative to the other, without in any way affecting the circuit opening and closing action of the treadle.

It will be apparent from the above that treadles of the present invention can be manufactured very inexpensively from parts which may be easily fabricated and which need not be made to close tolerances, that the various parts may very readily be assembled, and that the finished structure is operationally superior to prior art constructions.

While but a limited number of embodiments have been here disclosed, it will be apparent that many variations may be made in the detailed design thereof without departing from the spirit of the invention as defined in the following claims.

I claim:

1. A treadle comprising upper and lower elements having opposing faces, one of said elements comprising a base, a sheet on said opposing face thereof, and resilient portions of said sheet being displaced from said sheet toward said other element, thereby leaving recesses in said sheet within which said portions may be housed, said other element, on said opposing face thereof, having a plurality of areas in registration with said resilient sheet portions which said resilient sheet portions engage, thereby urging said elements apart, and over which said resilient sheet portions slide when said elements are moved toward one another, said resilient sheet portions being received within said sheet recesses when said elements are thus moved, said areas being substantially larger than said resilient sheet portions so that the parts of said resilient sheet portions which engage said other element always do so within said areas regardless of whether said elements are moved toward one another or apart, and said elements carrying actuating members which engage, when said elements are moved toward one another, said actuating members being positioned outside said recesses and areas respectively, on said opposing faces.

2. The treadle of claim 1, in which said sheet is formed of conductive material, said areas on said other element being non-conductive, the operative portion of said opposing face of said other element, except at said areas, comprising a layer of conductive material, said sheet and said layer comprising said actuating members, and electrical connections to said sheet and layer respectively.

3. A treadle comprising a base plate, a lower element on said base plate, an upper element thereabove, said elements having opposing faces, said base plate extending out beyond the periphery of said elements, a cover member over said upper element, extending outwardly beyond the periphery of said elements, and there overlying said base plate, closure members secured to said base plate so as to extend over at least a portion of the periphery thereof and over the outwardly extending portions of said cover member and compressing said outwardly extending portions of said cover member between itself and said base plate, one of said elements comprising, on said opposing face thereof, a sheet, and resilient portions of said sheet being displaced from said sheet toward said other element, thereby leaving recesses in said sheet within which said portions may be housed, said other element, on said opposing face thereof, having a plurality of areas in registration with said resilient sheet portions which said resilient sheet portions engage, thereby urging said elements apart, and over which said resilient sheet portions slide when said elements are moved toward one another, said resilient sheet portions being received within said sheet recesses when said elements are thus moved, said areas being substantially larger than said resilient sheet portions so that the parts of said resilient sheet portions which engage said other elements always do so within said areas regardless of whether said elements are moved toward one another or apart, and said elements carrying actuating members which engage, when said elements are moved toward one another, said actuating members being positioned outside said recesses and areas respectively, on said opposing faces.

4. In the treadle of claim 3, conductors operatively electrically connected to said actuating members, said closure members having channels extending longitudinally thereof outside the point where said cover member is compressed and one of said closure members having a slot communicating between said channel and the interior of said treadle inside the point where said cover member is compressed, and said treadle having an opening communicating with said channels, said conductors extending through said channels from said slot to said opening, through which opening said conductors escape from said treadle.

5. A treadle comprising a base plate, a lower element on said base plate, an upper element thereabove, said elements having opposing faces, said base plate extending out beyond the periphery of said elements, a cover member over said upper element, extending outwardly beyond the periphery of said elements, and there overlying said base plate, closure members secured to said base plate so as to extend over at least a portion of the periphery thereof and over the outwardly extending portions of said cover member and compressing said outwardly extending portions of said cover member between itself and said base plate, one of said elements comprising, on said opposing face thereof, a sheet, and resilient portions of said sheet being displaced from said sheet toward said other element, thereby leaving recesses in said sheet within which said portions may be housed, said other element comprising a non-conductive base with a layer of conductive material on said opposing face thereof, exposed areas of said opposing face of said other element being con-conductive, said areas being in registration with said resilient sheet portions and being engaged by said resilient sheet portions, thereby urging said elements apart, said resilient sheet portions sliding over said areas when said elements are moved toward one another, said resilient sheet portions being received within said sheet recesses when said elements are thus moved, said areas being substantially larger than said resilient sheet portions so that the parts of said resilient sheet portions which engage said other elements always does so within said areas regardless of whether said elements are moved toward one another or apart, said sheet and said layer comprising actuating members, and electrical connections to said sheet and said layer respectively.

6. The treadle of claim 5, in which said electrical connections comprising conductors operatively connected to said sheet and layer respectively, said closure members having channels extending longitudinally thereof outside the point where said cover member is compressed and one of said closure members having a slot communicating between said channel and the interior of said treadle inside the point where said cover member is compressed, and said treadle having an opening communicating with said channels, said conductors extending through said channels from said slot to said opening, through which opening said conductors escape from said treadle.

7. A treadle comprising a base plate, a lower element thereon, an upper element above said lower element, said base plate extending out beyond the periphery of said elements, a cover member of compressible material positioned over said upper element, extending outwardly beyond the periphery of said elements, and there overlying said base plate, closure members secured to said base plate at points beyond the periphery of said elements so as to extend over at least a portion of the periphery of said base plate and over the outwardly extending portions of said cover member and compressing said outwardly extending portions of said cover member between itself and said base plate, means for resiliently urging said elements apart, actuating members carried by said elements, electrical connections to said actuating members including a conductor, said closure members having channels extending longitudinally thereof outside the point where said cover member is compressed and one of said closure members having a slot communicating between said channel and the interior of said treadle inside the point where said cover member is compressed, and said treadle having an opening communicating with said channels, said conductors extending through said channels from said slot to said opening, through which opening said conductors escape from said treadle.

8. A treadle comprising upper and lower elements having opposing faces, one of said elements comprising a sheet of resilient conductive material from which resilient portions are displaced toward said other element, thereby leaving recesses in said sheet within which said portions may be housed, said other element comprising a base said opposing face of which is conductive, said resilient sheet portions operatively engaging said other element so as to urge said elements apart and slidable over said other element when said elements are moved toward one another, said resilient sheet portions being received within said sheet recesses when said elements are thus moved, means for electrically separating said resilient sheet portions from the conductive opposing face of said other element, and electrical connections to said sheet and to said conductive opposing face of said other element respectively.

9. A treadle comprising upper and lower elements having opposing faces, said element faces being of appreciable area corresponding substantially to the total exposed area of said treadle, one of said elements comprising a base, a conductive sheet on said opposing face of said base, and a plurality of resilient portions of said sheet being displaced from said sheet toward said other element at places distributed substantially uniformly over the entire area thereof, thereby leaving a plurality of recesses in said sheet within which said portions may be housed, said other element comprising a non-conductive base with a layer of conductive material on said opposing face thereof except at a plurality of areas in registration with said resilient sheet portions, said areas being substantially larger than said resilient sheet portions, said resilient sheet portions engaging said non-conductive base at said areas to urge said elements apart, said resilient sheet portions sliding over said areas when said elements are moved toward one another and being received within said sheet recesses when said elements are thus moved, and electrical connections to said sheet and layer respectively, whereby, although said resilient sheet portions are electrically charged, they do not engage said layer of conductive material on said other element.

10. A treadle comprising upper and lower elements having opposing areas of appreciable area corresponding substantially to the total exposed area of said treadle, one of said elements comprising a sheet of resilient conductive material from which a plurality of resilient portions are displaced toward said other element at places distributed substantially uniformly over the area thereof, thereby leaving a plurality of recesses in said sheet within which said portions may be housed, said other element comprising a base said opposing face of which is conductive, said resilient sheet portions operatively engaging said other element so as to urge said elements apart and slidable over said other element when said elements are moved toward one another, said resilient sheet portions being received within said sheet recesses when said elements are thus moved, means for electrically separating said resilient sheet portions from the conductive opposing face of said other element, and electrical connections to said sheet and to said conductive opposing face of said other element respectively, whereby, although said resilient sheet portions are electrically charged, they do not engage said conductive opposing face of said other element.

11. The treadle of claim 7, in which said closure members are provided with depending portions which engage and compress said outwardly extending portions of said cover member, said closure member slot passing through said depending portions.

References Cited in the file of this patent

UNITED STATES PATENTS

| | | |
|---|---|---|
| 774,436 | Johnson | Nov. 8, 1904 |
| 1,034,223 | Erickson | July 30, 1912 |
| 2,138,549 | La Bell | Nov. 29, 1938 |
| 2,165,227 | Cooper | July 11, 1939 |
| 2,244,933 | Armstrong | June 10, 1941 |